(12) United States Patent
Trejo

(10) Patent No.: US 7,959,401 B2
(45) Date of Patent: Jun. 14, 2011

(54) CONVEYOR SYSTEM FOR FOOD PRODUCTS

(75) Inventor: Joaquin Alverde Trejo, Municipio de Metepec (MX)

(73) Assignee: Grupo Bimbo S.A.B. DE C.V., Mexico City (MX)

( * ) Notice: Subject to any disclaimer, the term of this patent is extended or adjusted under 35 U.S.C. 154(b) by 257 days.

(21) Appl. No.: 12/221,955

(22) Filed: Aug. 8, 2008

(65) Prior Publication Data
US 2009/0060701 A1 Mar. 5, 2009

(30) Foreign Application Priority Data

Sep. 3, 2007 (MX) .................. MX/A/2007/010736

(51) Int. Cl.
*B65G 59/00* (2006.01)
*B65H 3/08* (2006.01)
*B65H 3/00* (2006.01)
*B65H 3/48* (2006.01)

(52) U.S. Cl. ............. 414/795.8; 414/795.7; 414/797.6; 414/796.7; 414/797; 198/803.5; 198/811; 198/955

(58) Field of Classification Search ............... 198/803.5, 198/811, 955; 271/112, 94; 414/795.8, 796.5, 414/796.7, 797, 797.2, 924
See application file for complete search history.

(56) References Cited

U.S. PATENT DOCUMENTS

| | | | | | |
|---|---|---|---|---|---|
| 2,690,337 | A | * | 9/1954 | Halahan et al. | 271/159 |
| 3,830,489 | A | * | 8/1974 | Adams | 271/9.12 |
| 4,189,270 | A | * | 2/1980 | Ehrlich | 414/790 |
| 4,381,596 | A | * | 5/1983 | Simonton et al. | 29/623.1 |
| 4,620,826 | A | * | 11/1986 | Rubio et al. | 414/793.1 |
| 5,435,432 | A | * | 7/1995 | Tacchi et al. | 198/409 |
| 5,494,398 | A | * | 2/1996 | Montemayor et al. | 414/797 |
| 5,531,156 | A | | 7/1996 | Brummett | |
| 5,687,641 | A | * | 11/1997 | Williamson et al. | 99/450.2 |
| 6,971,838 | B2 | * | 12/2005 | Johnson et al. | 414/796.7 |

* cited by examiner

*Primary Examiner* — Gregory W Adams
(74) *Attorney, Agent, or Firm* — Brinks Hofer Gilson & Lione

(57) ABSTRACT

An apparatus and method are disclosed for separating a pile of tortillas and individually depositing the tortillas on a conveyor to form a row of tortillas. The apparatus may include an accumulating device, an elevating device that is operable to remove a pile of tortillas from the accumulating device and elevate the pile of tortillas towards a vacuum conveyor. The vacuum conveyor is operable to continuously remove an uppermost tortilla from the pile of tortillas and transport the separated tortillas to a receiving conveyor. The separated tortillas are deposited on the receiving conveyor and may be transported to a subsequent processing operation.

21 Claims, 7 Drawing Sheets

CONVEYOR SYSTEM FOR FOOD PRODUCTS

CLAIM OF PRIORITY

This application claims priority under 35 USC §119 to Mexican Patent Application Serial No. MX/a/2007/010736, filed on Sep. 3, 2007, the entire contents of which are hereby incorporated by reference.

TECHNICAL FIELD

This invention relates to a method and apparatus for unstacking a pile or stack of flat food products, such as tortillas, and depositing the tortillas in series on a conveyor.

BACKGROUND

In the manufacture of tortillas, when the tortillas have been formed, the general tendency is to pile up the tortillas at different heights. Therefore, an apparatus that separates and individually places the tortillas on a band or conveyor is thus needed in order to prepare the tortillas for a subsequent processing operation, such as baking, frying, tearing the tortillas into strips, etc. Present automated techniques used to make tortillas require complex machines to replace the traditional manual production method or hinge press. Complex machines are also necessary to accumulate a certain quantity of tortillas to be used in subsequent processes or to separate the tortillas. Separating tortillas after manufacture and before storage is important since, without separating, storing the tortillas causes the tortillas to adhere to neighboring tortillas. Such adhesion diminishes the totillas' quality, creating a problem for the consumer.

Several techniques have been developed, such as the technique described in U.S. Pat. No. 5,494,398 by Montemayor et al. The Montemayor technique describes an apparatus used to separate the tortillas contained in piles, where the tortilla at the top of a tortilla pile is removed by a drilled cylinder. A suction is produced in the interior of the drilled cylinder by a fan, causing the tortilla located at the top of the tortilla pile to adhere to an exterior surface of the drilled cylinder. The tortilla can then be subsequently deposited on a band or conveyor. However, the technique described in Montemayor is deficient because the described technique is based upon the use of a single cylinder, which is unworkable at a wide transfer station because the size of the drilled cylinder becomes critical. Additionally, the Montemayor technique does not provide a flexible and soft delivery onto the band or conveyor, which may damage the tortillas.

U.S. Pat. No. 5,531,156 by Brummett describes an apparatus to bend tortillas and make tacos with soft tortillas as well as "tostadas" (fried tortillas). Brummett describes an apparatus that accumulates the soft tortillas as well as the tostadas, which travel on a "V" conveyor. The tortillas are then taken from tortilla piles by a hollow head deposited between a pair of plates where the tortillas are compressed and heated. A mechanical finger moves downward to bend the tortillas and push the tortillas through the "V" conveyor. The Brummett apparatus also includes hot and cold food dispensing stations. As the tortilla travels on the conveyor, the tostadas are taken from piles. Particularly, a tostada is removed from the pile by a scraper that is inserted between a tostada at the bottom of the pile and the tostada thereabove. The lower tostada is released while the remainder of the pile remains supported. The released tostada travels through the "V" conveyor and passes under the hot and cold food dispensers. Therefore, Brummett describes taking a top tortilla from a tortilla pile by a hollow head. However, Brummett fails to describe a band that efficiently transfers individual tortillas from a tortilla pile and softly deposits the tortillas onto a conveyor.

SUMMARY

An object of the present disclosure is to provide a tortilla transfer device that provides improved handling of flat food items, such as tortillas, and transportation of the tortillas to an additional processing operation after manufacturing the tortillas. For example, after being made, the tortillas may be transported to an operation that transforms the tortillas into tostadas or a fried food. Due to the large number of tortillas to be processed and the need to separate the tortillas from each other, the present disclosure describes a tortilla transfer apparatus. Tortillas may be fed from a conveyor to a post-processing feeder. The tortilla transfer apparatus may be fed by a band (interchangeably referred to as "conveyor") or may be manually fed from a transfer table containing piles of tortillas. The piles of tortillas may have been formed by an operator. Alternately, an accumulating device may produce the piled tortillas. The piles of tortillas may be formed in such a way that the tortilla piles are substantially uniform. When the accumulating device is full, a button may be pressed, causing an electric controller (PLC) to execute a previously programmed routine. As a result, the accumulating device is horizontally displaced towards and engages an elevating table. The accumulating apparatus and the elevating table are formed from a plurality of vertical walls. The vertical walls of the accumulating apparatus are offset from the vertical walls of the elevating table. Consequently, the vertical walls of the accumulating apparatus and the vertical walls of the elevating table intermesh. The horizontal displacement is achieved by actuation of a piston and a plurality of slides. When the accumulating device and the elevating table are coupled together, the tortilla piles are transferred onto the elevating table and the accumulating device is withdrawn. As a result, a number of tortilla piles ordered by an operator are made to reside on a surface of the elevating table. A piston controlled by a servo valve may then cause the tortilla piles arranged at a top of the elevating table to be elevated until an upper band or conveyor with hollow vents removes the tortilla located at the top of the tortilla piles. The tortilla at the top of a tortilla pile is made to temporarily adhere to the conveyor due to vacuum communicated through the vents formed in the conveyor. The tortilla remains adhered to the conveyor until the vents are passed over rollers of such vacuum conveyor, which seals the vents causing the loss of vacuum. As a result, the tortillas fall from the conveyor due to gravity onto a conveyor. The conveyor transports the separated tortillas in ordered rows to a subsequent process, such as baking, frying, grinding, etc.

The details of one or more implementations are set forth in the accompanying drawings and the description below. Other features, objects, and advantages will be apparent from the description and drawings, and from the claims.

DETAILED DESCRIPTION

Figure 1:
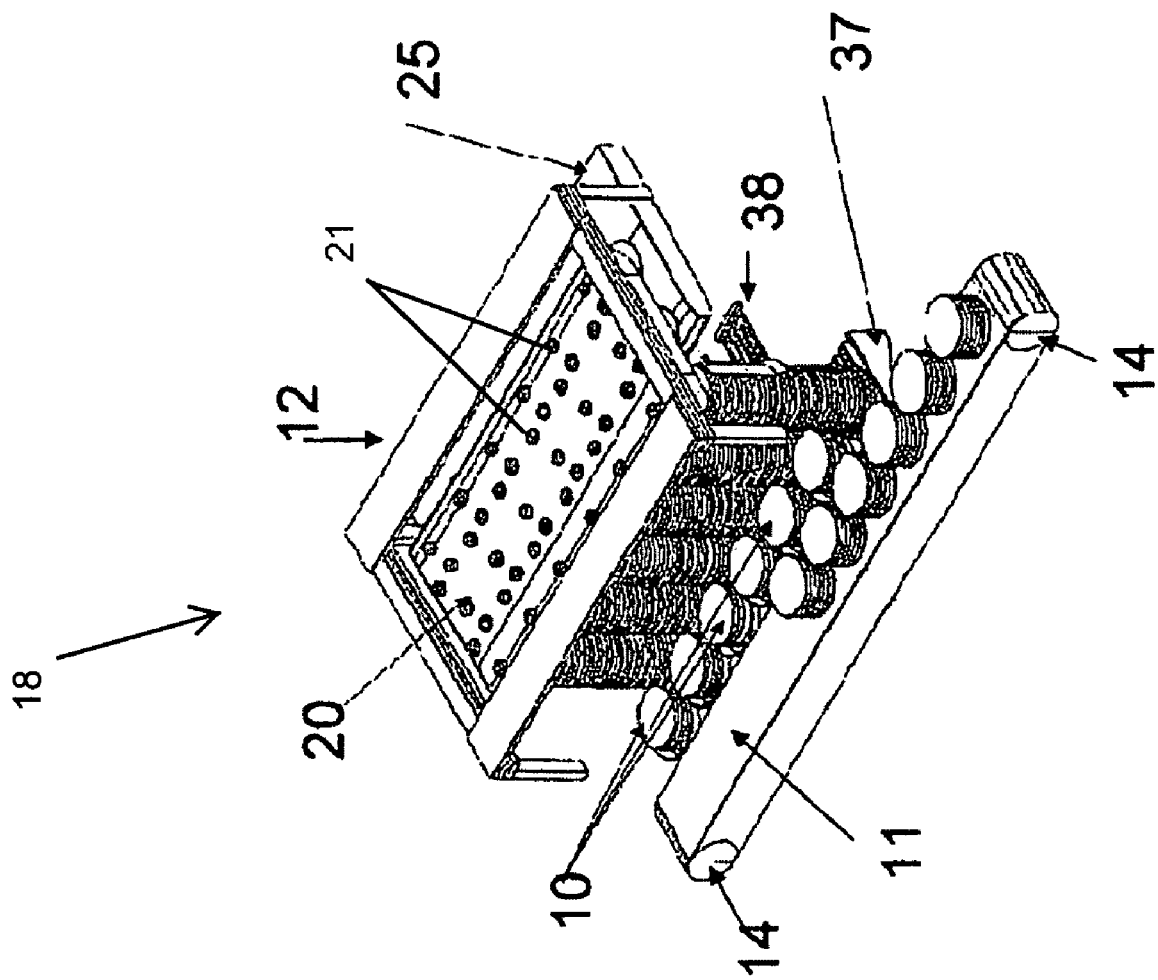
FIG. 1 is a perspective view of a tortilla transfer apparatus.

FIG. 1 shows a tortilla transfer apparatus 18 with tortilla piles 10 in different stages of formation. A tortilla arriving band or first conveyor 11 on rollers 14 transports tortillas to the tortilla transfer apparatus 18. The tortilla transfer apparatus 18 includes an accumulating device 37, a second conveyor 25, an elevating table 38, a vacuum band or conveyor 20 having a plurality of vents 21, and a supporting frame 12 that supports the vacuum conveyor 20. The first conveyor 11 transports tortillas to the tortilla transfer apparatus 18. An operator may transfer to the tortillas being conveyed by the first conveyor 11 to the tortilla piles 10. The vacuum conveyor 20 resides at an upper portion of the tortilla transfer apparatus 18 and travels over a pair of rollers. The vents 21 formed in the vacuum conveyor 20 provide communication with a suction formed therein and the tortilla provided at a top of the tortilla piles 10. The suction causes the uppermost tortilla in an individual pile 10 to adhere to the vacuum conveyor 20, allowing the uppermost tortilla to be transported horizontally to the second conveyor 25. The second conveyor 25 may be formed from metal.

Figure 2:
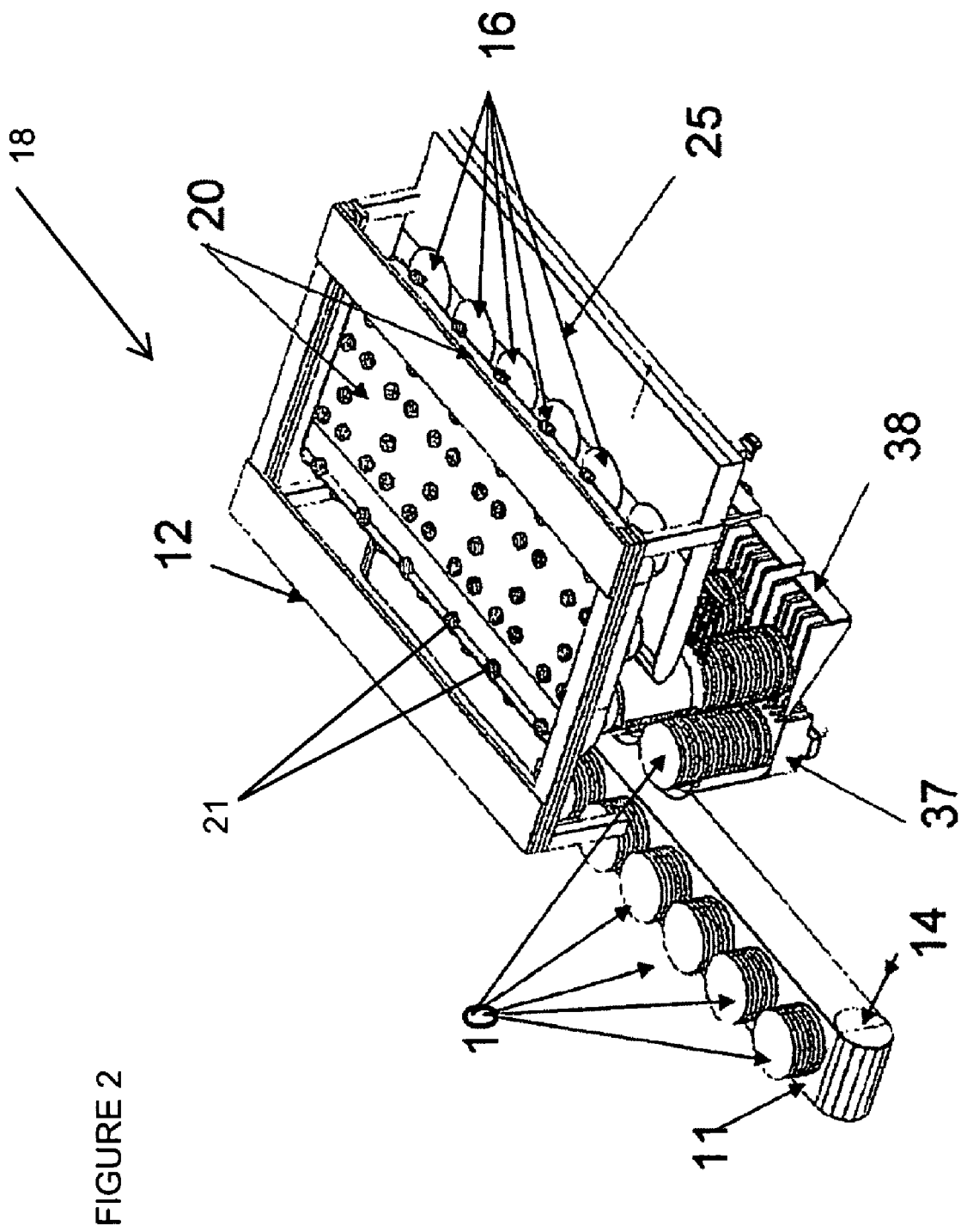
FIG. 2 is another perspective view of the tortilla transfer apparatus of FIG. 1.

FIG. 2 is another view of the tortilla transfer apparatus 18 showing the accumulating device 37, and the elevating table 38. The elevating table 38 and the accumulating device 37 are formed from a plurality of vertical walls, the upper edges of which support tortilla piles 10. The vertical walls of the elevating table 38 and the accumulating device 37 intermesh allowing the tortilla piles 10 disposed on the accumulating device 37 to be transferred to the elevating table 38. As also shown, tortillas transported by the vacuum conveyor 20 are individually deposited on the second conveyor 25.

Figure 3:
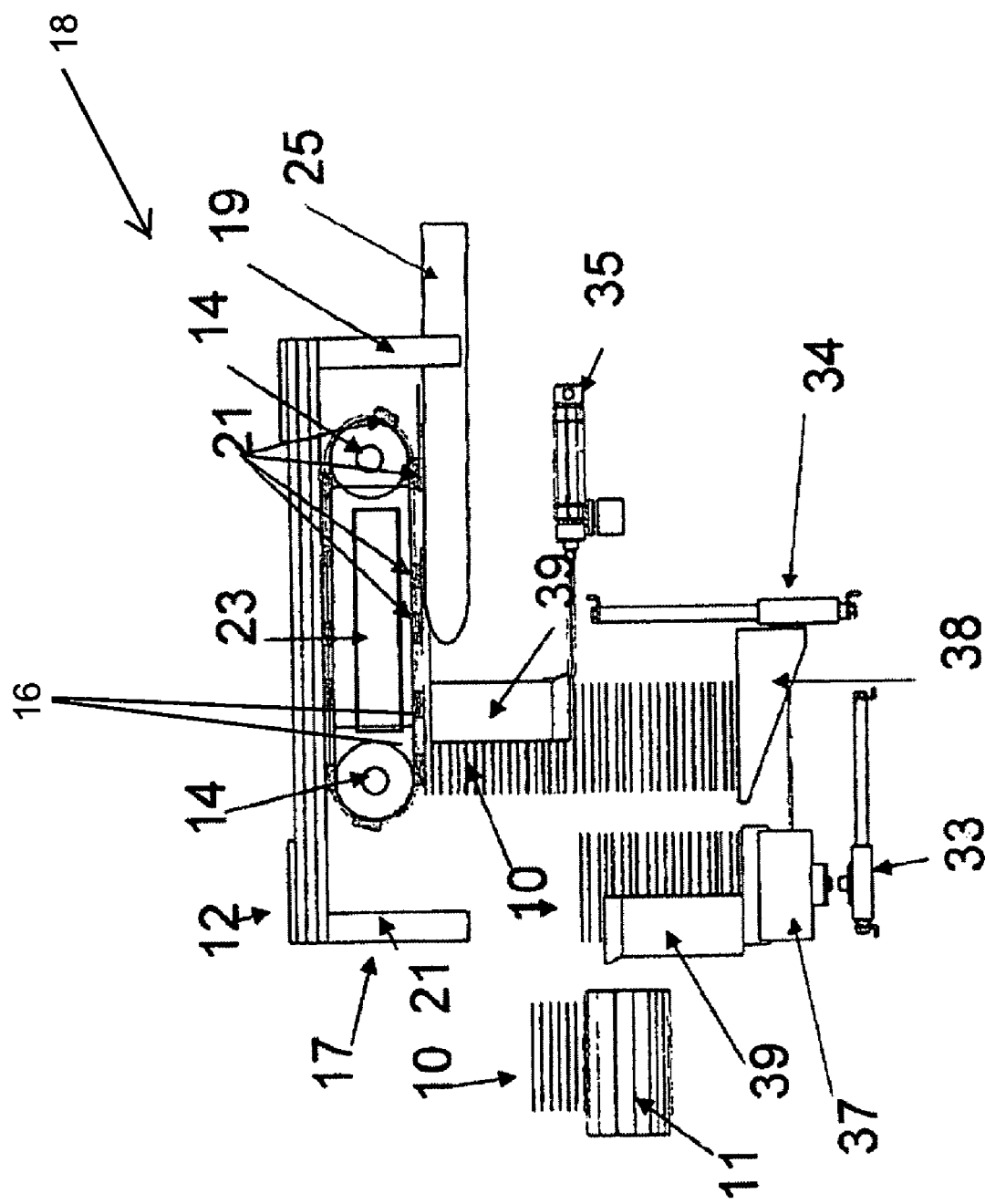
FIG. 3 is a side view of the tortilla transfer apparatus of FIG. 1.

FIG. 3 shows a side view of the tortilla transfer apparatus 18. The first conveyor 11, which may be formed from a polymer such as a vinyl covered fabric, transports the tortillas to the tortilla transfer apparatus 18. However, the first conveyor 11 need not be used. The first conveyor 11 may transport the tortillas from a previous processing operation, such as a tortilla forming operation, or from storage. The accumulating device 37 includes a plurality of vertical walls whose upper edges form a support surface for the tortilla piles 10. In some instances the accumulating device 37 may be constructed of stainless steel in order to provide improved corrosion resistance as well as to facilitate cleaning. For example, stainless steel provides resistance to microorganisms. The accumulating device 37 may also include stabilizing guards 39, which provide stability to the tortilla piles 10 so that the tortilla piles 10 do not collapse as a result of motion or from the height of the tortilla piles 10. A piston 33 is operable to extend and retract the accumulating device 37. The piston 33 may be hydraulic or pneumatic. Further, the piston 33 is operable to extend and retract at a rate to prevent the tortilla piles 10 disposed on the accumulating device 37 from collapsing.

In operation, the elevating table 38 is lowered to a bottom position and the piston 33 is actuated, extending the accumulating device 37 until the vertical walls of the accumulating device 37 are intermeshed with the vertical walls of the elevating table 38. The elevating table 38 may then be raised to effect a successful transfer of the tortilla pile 10 from the accumulating device 37 to the elevating table 38. In some instances, a hydraulic or pneumatic piston 34, controlled, for example, by a servo valve, may be used to raise and lower the elevating table 38. The elevating table 38 raises the tortilla pile 10 so that an uppermost tortilla of the pile of tortillas 10 lies closely adjacent to the vacuum conveyor 20. Because maintaining a defined distance between the uppermost tortilla and the vacuum conveyor 20 is important and because a thickness of the tortilla 16 is not uniform, the distance between the uppermost tortilla and the vacuum conveyor 20 is controlled by the rate at which the elevating table 38 is raised along with a proximity sensor that detects a distance between the uppermost tortilla and the vacuum conveyor 20. This control is operable to maintain a desired distance between the uppermost tortilla and a vent 21 on the vacuum conveyor 20.

The elevating table 38 may also include a slide system and a stabilizing guard 39. The stabilizing guard 39 may include a piston, such as a hydraulic or pneumatic piston, to extend and/or retract the stabilizing guard 39 to provide more stability to the tortilla piles 10. The stabilizing guard 39 counteracts a force along a vertical axis of the tortilla piles 10 that may cause the tortilla piles 10 to collapse. A suction maintained through the vents 21 causes the uppermost tortilla to temporarily adhere to the vacuum conveyor 20. The vacuum conveyor 20 transports the tortillas to the second conveyor 25 onto which the tortillas are delicately placed in rows. Consequently, the tortilla transfer apparatus 18 is operable to transform the tortilla piles 10 into rows of tortillas formed on the second conveyor 25. The rows of tortillas formed on the second conveyor 25 may then be transported to a subsequent processing operation.

Figure 4:
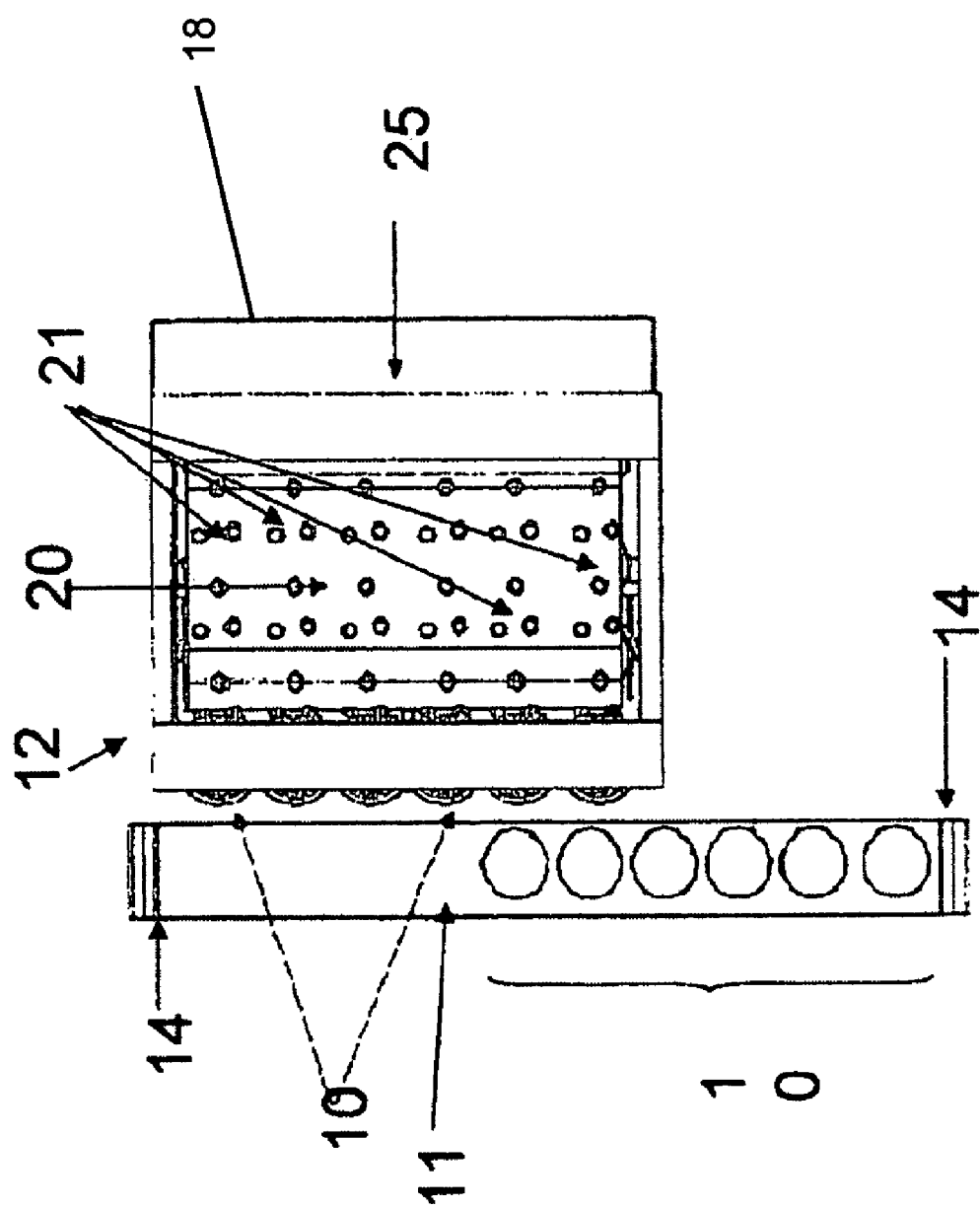
FIG. 4 is a top view of the tortilla transfer apparatus of FIG. 1.
Figure 5:
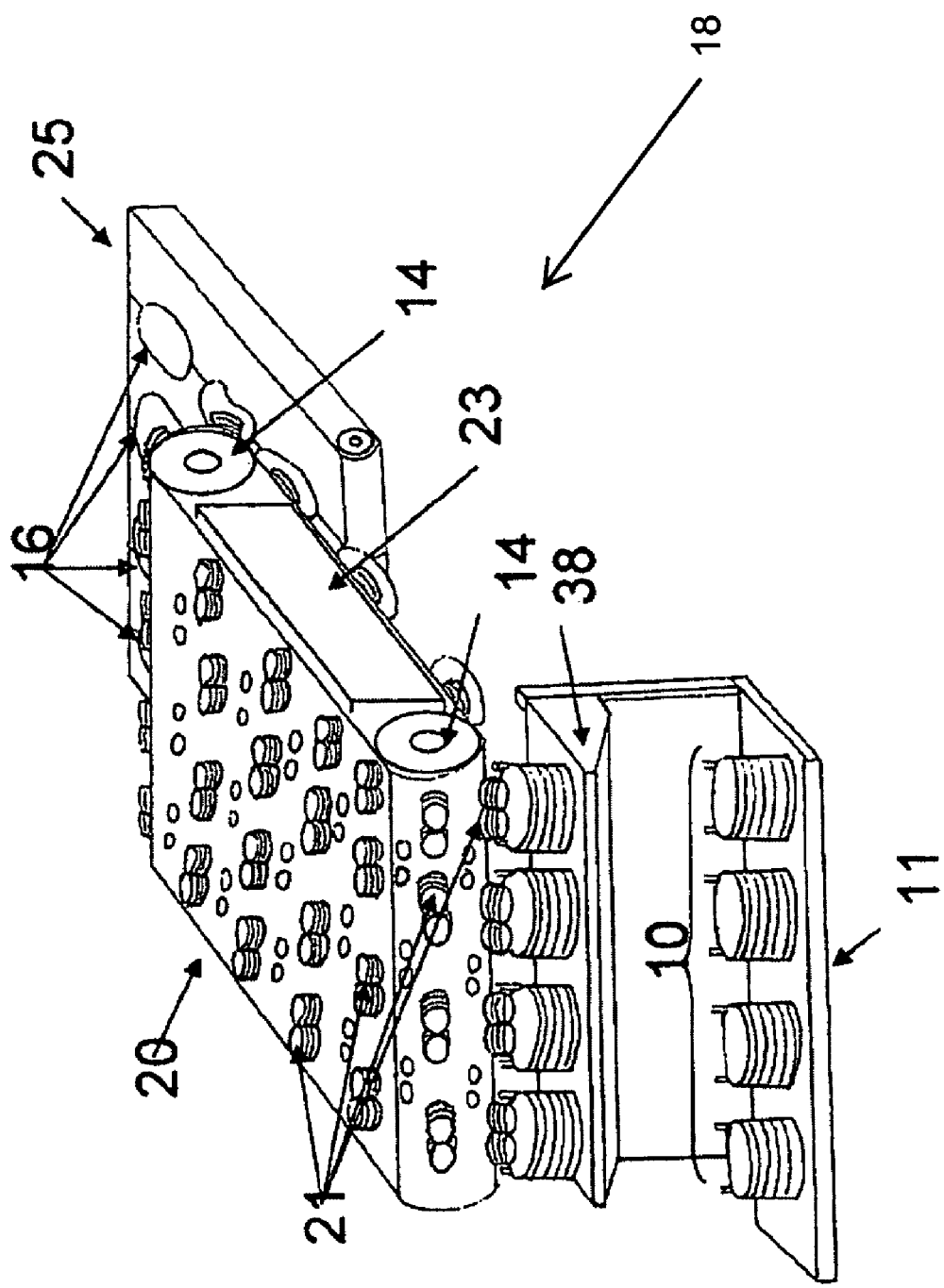
FIG. 5 is a front perspective view of the tortilla transfer module of FIG. 1 without guards or a supporting frame.

FIG. 4 shows a top view of the tortilla transfer apparatus 18. As shown in FIGS. 4 and 5, the tortilla piles 10 are transported to the tortilla transfer apparatus 18 by the first conveyor 11. However, in some instances, the first conveyor 11 may be eliminated. For example, a layout of a manufacturing process may eliminate a need for the first conveyor 11. That is, the tortilla piles 10 may be provided directly to the tortilla transfer apparatus 18 by an adjacent machine or process operation without the need for the first conveyor 11. FIG. 4 shows the vacuum conveyor 20 as well as the vents 21 formed therein. A flow of air through the vents 21 produces a suction or vacuum that holds the uppermost tortillas of the tortilla piles 10 against the vacuum conveyor 20

Figure 6:
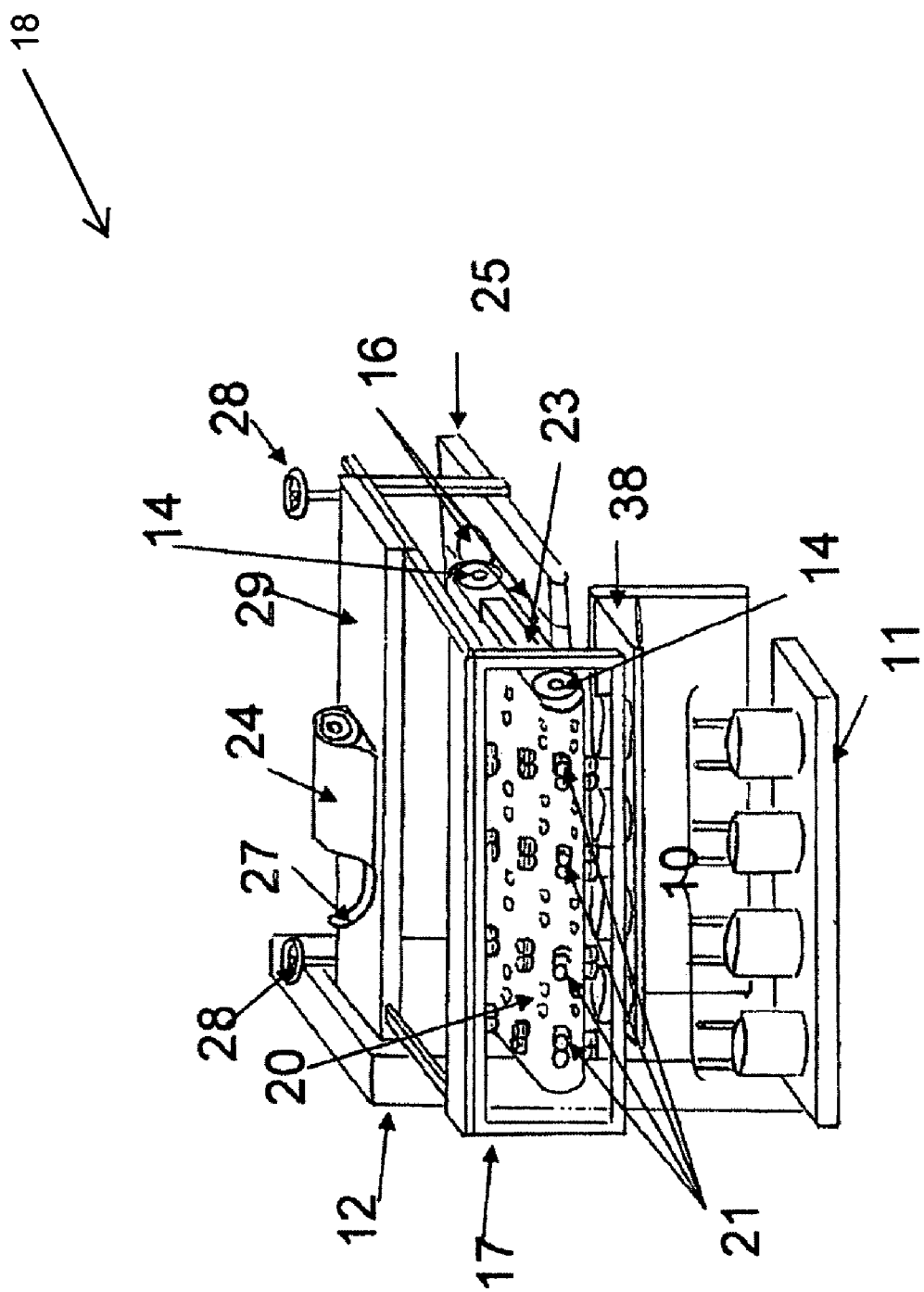
FIG. 6 is another perspective view of the tortilla transfer apparatus of FIG. 1 with a front guard but without a right-side supporting frame.

As shown in FIG. 6, for example, the supporting frame 12 provides rigidity to the vacuum conveyor 20, alignment for rollers 14 on which the vacuum conveyor 20 travels, and a vacuum system. The supporting frame 12 may be formed from tubular steel. In some implementations, the vacuum system includes a motor or engine, a suction hose 27, and a vacuum apparatus 24 for generating a vacuum. In some implementations, the vacuum apparatus 24 may be a compressor and a Venturi system, which may reduce a size of the tortilla transfer apparatus 18 and, thus, save space. In other instances, the vacuum apparatus 24 may be a suction pump or extractor. In still other instances, the vacuum apparatus 24 may be a ventilator incorporated into or used in combination with a compressor or a compressor jointly with a storage tank and flow regulating system. The rollers 14 may be coupled to an electric motor, which rotates the rollers 14 and causes the vacuum conveyor 20 to travel. The electric motor may be controlled to control a speed of the vacuum conveyor 20. In some instances, the vacuum system may be located at a top of the supporting frame 12 and coupled to a suction plate 23. As shown in FIG. 5, the vacuum conveyor 20 circumscribes a central volume, and the suction plate 23 is disposed in the central volume. The suction plate 23 may include a plurality of openings, and air flow from the vacuum system may be drawn in through the plurality of openings formed in the suction plate 23. Thus, the vacuum apparatus 24 may produce a suction airflow through the suction hose 27. As a result, the airflow passing from an exterior of the vacuum conveyor 20, in through the vents 21 formed in the vacuum conveyor 20, into an interior volume of the suction plate, and through the suction hose 27, thereby forming a vacuum for the transporting tortillas 16. In other instances, the interior volume may be isolated and the rollers 14 may include a plurality of openings through which an air flow is produced to form a suction through the vents 21. The tortillas 16 are exposed to the generated vacuum at the vents 21 in the vacuum conveyor 20. The generated vacuum is operable to hold the tortillas 16 to the vacuum conveyor 20 as the tortillas 16 are being transported from the tortilla piles 10 located on the elevating table 38 to the second conveyor 25.

Figure 7:
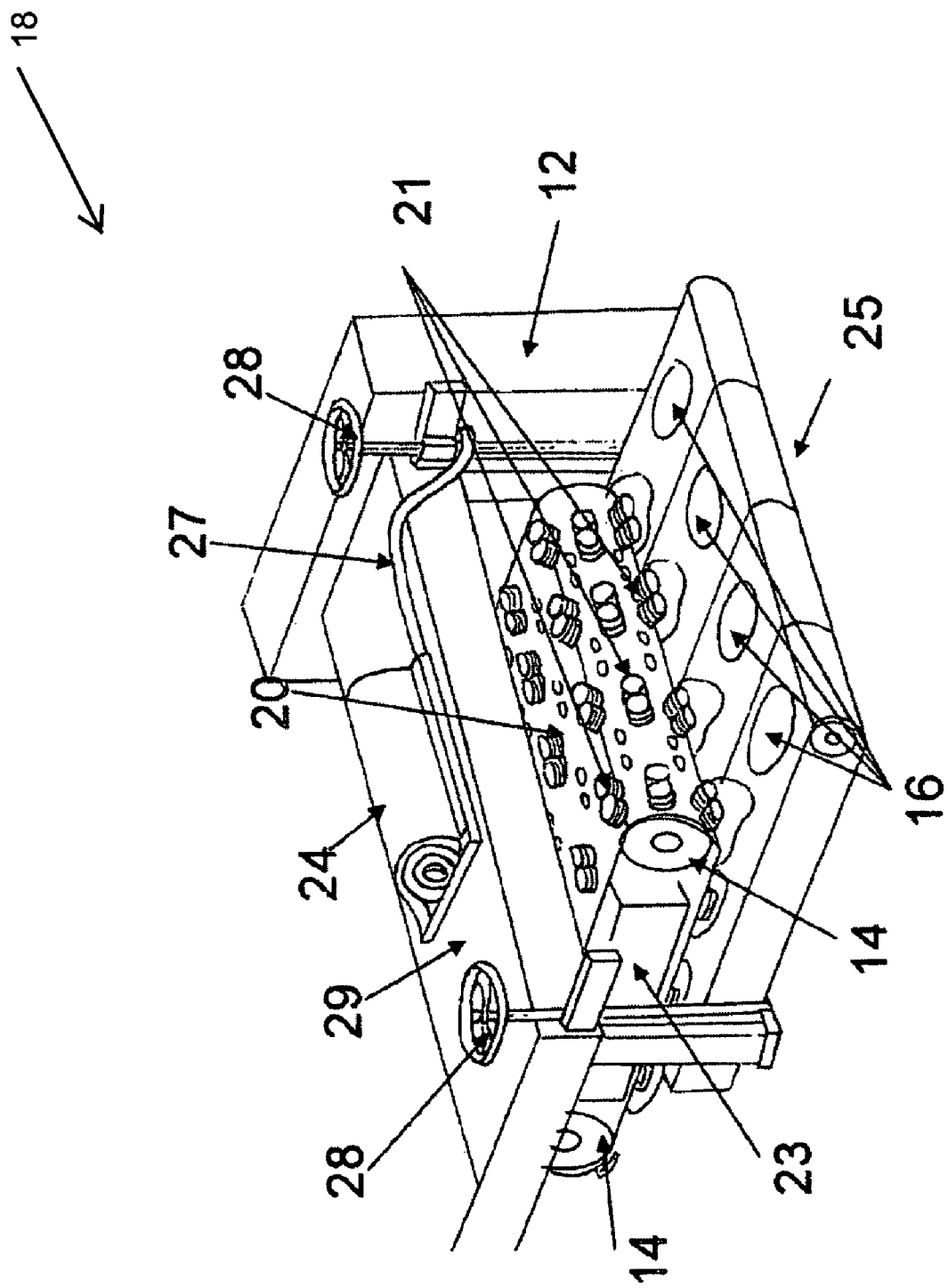
FIG. 7 is a further perspective view of the tortilla transfer apparatus without guards or the right-side supporting frame.

FIG. 6 is another view of the tortilla transfer apparatus 18 showing a portion of the supporting frame 12 removed. As a result, the rollers 14 supporting the vacuum conveyor 20 and the suction plate 23 can be viewed. The second conveyor 25, onto which the tortillas 16 are deposited from the vacuum conveyor 20, is also shown. A separation distance between the vacuum conveyor 20 and the second conveyor 25 is controllable. As shown in FIGS. 6 and 7, this separation distance may be adjusted with elevating mechanism 28. The elevating mechanism 28 includes a pair of handles connected to a screw mechanism and bushing nut. Operating the elevating mechanism 28 enables the second conveyor 25 to be placed at a desired elevation. FIGS. 6 and 7 also show a top cover 29 on which the vacuum apparatus 24 is located. As also shown, the suction hose 27 is coupled to the vacuum apparatus 24 at a first end while an opposite end of the suction hose 27 is coupled to a suction plate 23. Thus, suction hose 27 provides for the generation of a vacuum within the suction plate 23.

Referring again to FIG. 7, a transfer zone where the tortillas 16 are transferred from the vacuum conveyor 20 to the second conveyor 25 is shown. Again, the elevating mechanism 28 is also shown. The elevating mechanism 28 is provided on the supporting frame 12 at each side of the second conveyor 25 permitting alignment of the second conveyor 25 and adjustment of the separation distance between the vacuum conveyor 20 and the second conveyor 25. The suction hose 27 extending between the vacuum apparatus 24 and the suction plate 23 is also shown. The tortillas 16 are released from the vacuum conveyor 20 when the tortillas 16 reach the roller 14 disposed over the second conveyor 25 because, as the belt or band of the vacuum conveyor 20 passes over the roller 14, the roller 14 seals off the vents 21 from the suction airflow. As a result, the vacuum at the vents 21 is lost and the tortillas 16 fall from the vacuum conveyor 20 onto the second conveyor 25.

A number of implementations have been described. Nevertheless, it will be understood that various modifications may be made without departing from the spirit and scope of the disclosure. Accordingly, other implementations are within the scope of the following claims.

What is claimed is:

1. A tortilla transfer apparatus comprising:
   a tortilla accumulating device extendable between a retracted position and an extended position, the accumulating device comprising:
   a first plurality of vertical members having a first gap formed between adjacent vertical members;
   an elevating table adjacent the accumulating device and extendable between a raised position and a lowered position, the elevating table comprising:
   a second plurality of vertical members having a second gap formed between adjacent vertical members;
   a vacuum conveyor disposed above the elevating table near the raised position of the elevating table, the vacuum conveyor comprising:
   a continuous belt disposed around at least two end rollers, said belt having a lower portion disposed above tortillas and moving longitudinally in a direction of movement of the tortillas; and
   a plurality of vents formed in the continuous belt;
   a vacuum system in fluid communication with the plurality of vents and operable to generate a vacuum with airflow through one or more of the vents into a vacuum suction plate disposed above the lower portion of the belt; and
   a receiving conveyor having a portion disposed below at least a portion of the vacuum conveyor and adapted to receive tortillas released from the vacuum conveyor;
   wherein the first plurality of vertical members of the accumulating device are aligned with the second gaps of the elevating table,
   wherein the second plurality of vertical members of the elevating table are aligned with the first gaps of the accumulating device, and
   wherein the first plurality of vertical members and the second plurality of vertical members intermesh when the tortilla accumulating device is in the extended position and the elevating table is in the lowered position.

2. The tortilla transfer apparatus of claim 1, wherein at least one of the end rollers on which the continuous passes over seals the plurality of vents as the vents pass over the roller thereby blocking the air flow through the vent into the vacuum suction plate.

3. The tortilla transfer apparatus of claim 1, wherein the tortilla accumulating device further comprises a supporting surface and an actuator, the actuator operable to extend and retract the supporting surface between the retracted position and the extended position.

4. The tortilla transfer apparatus of claim 1, wherein the elevating table comprises an elevating surface and an actuator, the actuator operable to extend and retract the elevating surface between the raised position and the lowered position.

5. The tortilla transfer apparatus of claim 1, wherein the vacuum system further comprises a vacuum generating apparatus in fluid communication with the vacuum suction plate and wherein the vacuum suction plate is in fluid communication with the vents formed in the continuous belt of the vacuum conveyor.

6. The tortilla transfer apparatus of claim 1, wherein the vents communicate the generated vacuum to an exterior of the continuous belt, and wherein the vacuum communicated through the vents is operable to temporarily adhere a tortilla to the continuous belt.

7. The tortilla transfer apparatus of claim 1, wherein the vacuum suction plate is disposed within a volume bounded by the continuous belt of the vacuum conveyor.

8. A method for unstacking a plurality of tortillas and arranging the unstacked tortillas in a row, the method comprising:
   providing a stack of tortillas on upper edges of a plurality of vertical members forming a portion of an accumulating device;
   extending the accumulating device towards an elevating table so that the vertical members of the accumulating device intermesh with vertical members forming a portion of the elevating table;

extending the elevating table to a raised position to transfer the stack of tortillas from the accumulating device to the elevating table;

extending the elevating table towards a continuous belt disposed above the stack of tortillas;

forming a vacuum;

communicating the vacuum through a plurality of vents formed in the continuous belt disposed above the stack of tortillas;

continuously adhering a tortilla from a top of the stack of tortillas to the continuous belt of a first conveyor with the vacuum communicated through vents adjacent the tortilla as the continuous belt is conveyed to form a row of tortillas on the continuous belt;

conveying the tortillas to a release position above a receiving conveyor;

sequentially releasing the tortillas from the continuous belt by blocking communication of the vacuum through vents adjacent the tortillas; and sequentially collecting the released tortilla on a receiving conveyor as the receiving conveyor is conveyed to form a row of tortillas thereon.

9. The method of claim 8 further comprising conveying the row of tortillas formed on the receiving conveyor to a delivery location.

10. The method of claim 8 further comprising supporting the stack of tortillas on one or more of the accumulating device or the elevating table.

11. The method of claim 8 further comprising extending the stack of tortillas towards the continuous belt so that the uppermost tortilla of the stack of tortillas is adjacent the continuous belt and at a defined distance from the continuous belt.

12. The method of claim 8, wherein forming a vacuum comprises generating a vacuum within an interior space circumscribed by the continuous belt.

13. The method of claim 8 further comprising extending the stack of tortillas towards the vacuum conveyor after the uppermost tortilla has been removed from the stack by the vacuum conveyor.

14. The method of claim 8, wherein sequentially releasing the tortillas from the continuous belt by blocking communication of the vacuum through vents adjacent the tortillas comprises passing the vents adjacent the tortillas over a roller of the first conveyor to isolate the vents from the vacuum.

15. A system for forming a row of tortillas from a stack of tortillas, the system comprising:

a tortilla transfer apparatus comprising:
an accumulating device comprising a first plurality of vertical members having gaps formed between adjacent vertical members;
an elevating device comprising:
a second plurality of vertical members having gaps formed between adjacent vertical members, the first plurality of vertical members configured to intermesh with the second plurality of vertical members;

a vacuum conveyor comprising:
a continuous belt extending over a pair of rollers, the continuous belt circumscribing an interior space;
a motor coupled to at least one roller and operable to drive the at least one roller and the continuous belt; and
a plurality of vents formed in the continuous belt, a first end of the vacuum conveyor disposed above the elevating table;

a vacuum system comprising:
a vacuum apparatus operable to generate a vacuum;
a suction plate in fluid communication with the vacuum apparatus and disposed in the interior space, the suction plate comprising a plurality of openings to communicate the vacuum to the vents formed in continuous belt;

a receiving conveyor disposed below a second end of the vacuum conveyor;

a first actuator operable to extend and retract the accumulating device between a retracted position and an extended position; and a second actuator operable to extend and retract the elevating table between a raised position and a lowered position; and a delivery conveyor operable to transport stacks of tortillas to a position adjacent the accumulating device.

16. The system of claim 15, wherein at least one of the accumulating device or the elevating table further comprises a support guard having a contoured shape to abut a corresponding shape of a stack of tortillas.

17. The system of claim 15, wherein at least one roller of the vacuum conveyor seals vents formed therein as the vents pass over the roller, isolating the vents from the vacuum.

18. The system of claim 15 further comprising a control system operable to control a distance between an uppermost tortilla of a tortilla stack and the continuous belt.

19. The system of claim 15, wherein the accumulating device further comprises a support guard having a contoured shape to abut a corresponding shape of a stack of tortillas.

20. The system of claim 15 further comprising a control system operable to maintain a selected distance between a lower surface of the continuous belt of the vacuum conveyor and a tortilla on the elevating device disposed adjacent the continuous belt.

21. The system of claim 20, wherein the control system comprises a proximity sensor adapted to detect a distance between the tortilla on the elevating device disposed adjacent the continuous belt and the continuous belt.

* * * * *